United States Patent
Curie et al.

(10) Patent No.: US 8,642,144 B2
(45) Date of Patent: Feb. 4, 2014

(54) INNERLINER WITH NYLON SKIN LAYER

(75) Inventors: Kevin J. Curie, Appleton, WI (US); Robert J. Blemberg, Appleton, WI (US)

(73) Assignee: Bemis Company, Inc., Neenah, WI (US)

( * ) Notice: Subject to any disclaimer, the term of this patent is extended or adjusted under 35 U.S.C. 154(b) by 0 days.

(21) Appl. No.: 12/334,188

(22) Filed: Dec. 12, 2008

(65) Prior Publication Data
US 2010/0151218 A1    Jun. 17, 2010

Related U.S. Application Data

(60) Provisional application No. 61/056,503, filed on May 28, 2008.

(51) Int. Cl.
*B32B 1/02*    (2006.01)
(52) U.S. Cl.
USPC ................... 428/35.7; 428/35.2; 428/34.8
(58) Field of Classification Search
USPC ................... 428/34.8, 35.7, 216, 214, 35.2
See application file for complete search history.

(56) References Cited

U.S. PATENT DOCUMENTS

| | | | |
|---|---|---|---|
| 4,615,926 A | 10/1986 | Hsu et al. | |
| 4,636,412 A | 1/1987 | Field | |
| 4,698,247 A | 10/1987 | Murray et al. | |
| 4,755,402 A | 7/1988 | Oberle | |
| 4,764,404 A | 8/1988 | Genske et al. | |
| 4,769,261 A | 9/1988 | Hazelton et al. | |
| 4,859,514 A | 8/1989 | Friedrich et al. | |
| 4,870,134 A | 9/1989 | Hwo | |
| 4,944,972 A | 7/1990 | Blembereg | |
| 4,980,210 A | 12/1990 | Heyes | |
| 5,066,543 A | 11/1991 | Hwo | |
| 5,080,253 A | 1/1992 | Zieke | |
| 5,106,688 A | 4/1992 | Bradfute et al. | |
| 5,158,499 A | 10/1992 | Guckenberger | |
| 5,358,791 A | 10/1994 | Johnson | |
| 5,427,807 A | 6/1995 | Chum et al. | |
| 5,482,770 A | 1/1996 | Bekele | |
| 5,558,930 A | 9/1996 | DiPoto | |

(Continued)

FOREIGN PATENT DOCUMENTS

| | | |
|---|---|---|
| CN | 1379714 A | 11/2002 |
| CN | 1845821 A | 10/2006 |

(Continued)

OTHER PUBLICATIONS

Permeabilty and Other Fim Properties of Plastics and Elastomers 1995.*

(Continued)

*Primary Examiner* — Ellen S Raudenbush
(74) *Attorney, Agent, or Firm* — Christine E. Parsons

(57) ABSTRACT

A multilayer film is provided that comprises a nylon skin layer, a buried high density polyethylene layer, and a sealant layer, for use, for example, to form a package for dry food products. The multilayer film has a thickness of less than about 2.0 mils, such as between 0.8-1.7 mils, a moisture vapor transmission rate of less than about 0.30 g/100 in$^2$/day, and a tear strength in the machine direction of greater than 40 grams, for instance at least about 120 grams. The multilayer film may further include a buried nylon layer and exhibit a tear strength in the machine direction of greater 190 grams.

20 Claims, 1 Drawing Sheet

(56) References Cited

U.S. PATENT DOCUMENTS

| | | |
|---|---|---|
| 5,689,935 A | 11/1997 | Derkach et al. |
| 5,763,095 A | 6/1998 | Ramesh et al. |
| 5,843,502 A | 12/1998 | Ramesh |
| 5,874,155 A | 2/1999 | Gehrke et al. |
| 5,888,648 A | 3/1999 | Donovan et al. |
| 6,003,670 A | 12/1999 | Beer |
| 6,060,137 A | 5/2000 | Akao |
| 6,210,764 B1 | 4/2001 | Hayes |
| 6,214,392 B1 | 4/2001 | Ramirez |
| 6,329,465 B1 | 12/2001 | Takahashi et al. |
| 6,333,061 B1 | 12/2001 | Vadhar |
| 6,355,732 B1 | 3/2002 | Beer |
| 6,479,137 B1 | 11/2002 | Joyner et al. |
| 6,482,532 B1 | 11/2002 | Yap et al. |
| 6,492,475 B1 | 12/2002 | Egashira et al. |
| 6,613,407 B1* | 9/2003 | Kaschel ................. 428/35.7 |
| 6,716,499 B1 | 4/2004 | Vadhar |
| 6,780,373 B1 | 8/2004 | Musco |
| 2001/0003624 A1 | 6/2001 | Lind et al. |
| 2001/0010846 A1 | 8/2001 | Hofmeister et al. |
| 2001/0036555 A1 | 11/2001 | Ramesh et al. |
| 2002/0006498 A1 | 1/2002 | Migliorini et al. |
| 2002/0012807 A1 | 1/2002 | Kurian et al. |
| 2002/0034622 A1 | 3/2002 | Edwards et al. |
| 2002/0086174 A1 | 7/2002 | Genske et al. |
| 2002/0150781 A1 | 10/2002 | Wanic et al. |
| 2002/0155267 A1 | 10/2002 | Bader |
| 2002/0160167 A1 | 10/2002 | Bader |
| 2002/0197425 A1* | 12/2002 | Wolf et al. ............... 428/35.2 |
| 2003/0017352 A1 | 1/2003 | Dayrit et al. |
| 2003/0055191 A1 | 3/2003 | Yasaka |
| 2003/0064181 A1 | 4/2003 | Ingraham |
| 2003/0091763 A1 | 5/2003 | Ferri |
| 2003/0099851 A1* | 5/2003 | Mount et al. ............. 428/476.1 |
| 2003/0170409 A1 | 9/2003 | Porter et al. |
| 2004/0023054 A1 | 2/2004 | Wolak |
| 2004/0043238 A1 | 3/2004 | Wuest et al. |
| 2004/0127614 A1 | 7/2004 | Jiang et al. |
| 2004/0146669 A1 | 7/2004 | Gollier et al. |
| 2004/0166261 A1 | 8/2004 | Pockat et al. |
| 2005/0085785 A1 | 4/2005 | Shang et al. |
| 2005/0129811 A1 | 6/2005 | Kraimer et al. |
| 2005/0153085 A1 | 7/2005 | Drummond |
| 2005/0202743 A1 | 9/2005 | Hausmann et al. |
| 2005/0249903 A1 | 11/2005 | Kendig et al. |
| 2005/0286808 A1 | 12/2005 | Zimmerman et al. |
| 2006/0046048 A1 | 3/2006 | Kapur et al. |
| 2006/0216488 A1 | 9/2006 | Schell et al. |
| 2007/0042146 A1 | 2/2007 | Sharp |
| 2008/0051518 A1 | 2/2008 | Sakamoto |
| 2009/0047490 A1* | 2/2009 | Scully et al. ................. 428/213 |

FOREIGN PATENT DOCUMENTS

| | | |
|---|---|---|
| CN | 1970288 A | 5/2007 |
| EP | 0 589 436 | 3/1994 |
| EP | 1 870 350 | 12/2007 |
| NL | 8 004 795 | 4/1982 |
| WO | 87/05583 | 9/1987 |
| WO | 94/09060 | 4/1994 |
| WO | 99/00248 | 1/1999 |
| WO | 99/51433 | 10/1999 |
| WO | 99/52972 | 10/1999 |
| WO | 2004/005021 | 1/2004 |
| WO | 2006/019922 | 2/2006 |
| WO | 2006/102152 | 9/2006 |
| WO | 2008/082975 | 7/2008 |

OTHER PUBLICATIONS

International Search Report in related International Patent Application No. PCT/US2009/044842, dated Nov. 2, 2009.

Ward, "New High-Performance SURPASS TM Linear PE Film Resins from NOVA Chemicals," retrieved from the Internet: URL: http://www.novachemicals.com/ResearchTech/docs/2007-06.pdf, retrieved on Oct. 1, 2007, pp. 8, 11.

* cited by examiner

INNERLINER WITH NYLON SKIN LAYER

CROSS-REFERENCE TO RELATED APPLICATION

This application is a non-provisional of U.S. Application No. 61/056,503, filed May 28, 2008, the entire disclosure of which is hereby incorporated by reference.

FIELD

The invention relates to a multilayer innerliner film structure prepared with a nylon skin layer.

BACKGROUND

A sealed innerliner package or bag placed in a box, referred to as a bag-in-a-box packaging, is conventionally used for dry food product applications such as cereal, cracker, and snack packaging. The bag acts as a moisture barrier to keep the contents of the bag fresh and the box provides a protective outer structure for storage and handling of the package. The bag is usually heat sealed along the top, the bottom and vertically along the center of the package to form a fin seal. When the bag is formed, a moisture barrier layer is typically positioned on the outer surface of the bag and a sealant layer faces the interior of the bag. As an alternative to an innerliner package, a multilayer polymeric package, which is not stored in a box, may instead be used for dry food products. The package is optionally surface printed, such as to provide information regarding the product contained in the package.

Downgauging (i.e., reducing thickness) of packaging has been an ongoing trend to improve economics and increase sustainability. For bag-in-box applications for dry food products, key attributes for the plastic multilayer film innerliner are its moisture barrier characteristics and its abuse resistance (e.g., tear and puncture strength). A conventional multilayer film structure useful for innerliners is, for example, about 2-3 mils thick.

By using recently developed high moisture barrier high density polyethylene (HDPE) resins, such as Nova's SUR-PASS®, the required moisture barrier can be accomplished with a relatively thin layer of HDPE, for example between about 0.3 and 1.0 mils. However, at this thickness, a multilayer film having a conventional sealant layer lacks the necessary stiffness and abuse resistance required for an innerliner package. Even with the use of nylon in the buried layer, as is typical for many innerliner structures, the multilayer film still has poor puncture and tear properties.

One approach to downgauging of a plastic package is to machine direction orient a blown or cast film, which improves the moisture barrier capabilities and many key physical properties. However, with an HDPE based multilayer film structure typical of an innerliner package, orientation causes the film to become splitty (i.e., weak) in the machine direction. This weakness can lead to a compromise in package performance, especially during opening of the package.

In addition to an HDPE based moisture barrier, innerliner packages may also contain buried, or interior, layers of nylon or ethylene vinyl alcohol (EVOH) for oxygen protection, as well as tie, or adhesive layers to bind the outer, buried and sealant layers together. A conventional multilayer innerliner structure may comprise layers in the following order, from the outer layer to the inner layer: HDPE/tie/nylon/tie/sealant.

A drawback to the conventional multilayer innerliner structure is that the structure can tend to curl when prepared using a blown film process. During blown film processing, the buried nylon layer is the first layer to freeze up during cooling, followed by the outer HDPE layer. Moreover, HDPE goes through a large volume change as it converts from a melted resin to a solid layer. The combination of the layer cooling order and the HDPE change in volume can result in curling of the film. A film that curls significantly is difficult to process on the packaging machine.

A further drawback to the employment of a surface HDPE outside layer in an innerliner structure is that it can result in a powder build up on the customer filling equipment. This powder is primarily low molecular weight HDPE that is present on the outer HDPE layer and contributes to maintenance and Environmental Health and Safety (EHS) costs.

SUMMARY

The present invention provides a multilayer film structure comprising a nylon skin layer.

In an embodiment, a multilayer film is provided that comprises a nylon skin layer, a buried high density polyethylene layer, and a sealant layer. The multilayer film has a thickness of less than about 2.0 mils and a tear strength in the machine direction of at least 40 grams. In certain embodiments, the multilayer film exhibits a tear strength in the machine direction of at least about 120 grams and a moisture vapor transmission rate of less than about 0.20 g/100 in$^2$/day. In certain embodiments, the multilayer film has a thickness of between 0.8 and 1.7 mils.

In another embodiment, a multilayer film is provided that comprises two nylon layers, a buried high density polyethylene layer, and a sealant layer. In an embodiment, the multilayer film also comprises an oxygen barrier layer.

DETAILED DESCRIPTION

Figure 1:
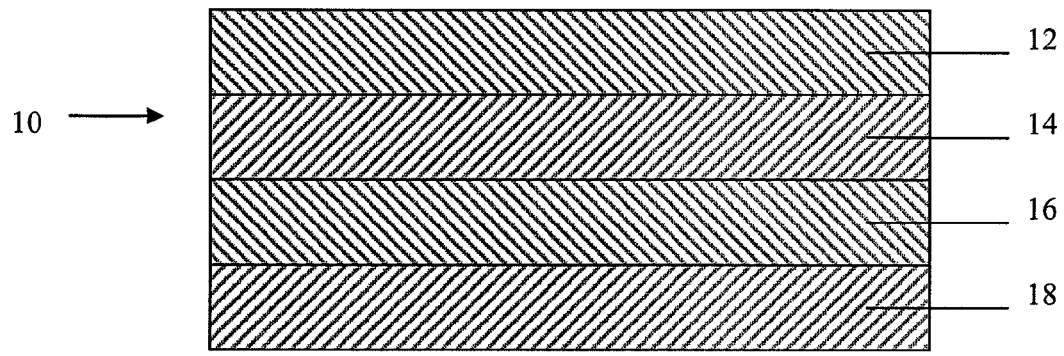
FIG. 1 illustrates a cross-section of a multilayer polymeric film comprising four layers.

An aspect of the invention is directed to the use of a polyamide, or nylon, layer as an outer surface layer instead of as a buried layer of a multilayer film structure. The nylon surface layer is used in the multilayer film structure to form, for example, an innerliner for packages. Referring to FIG. 1, in accordance with one aspect of the invention, a four layer multilayer film 10 comprises layers 12, 14, 16 and 18, and has the following structure, from outer skin layer to inner sealant layer: nylon (12)/tie (14)/HDPE (16)/sealant (18).

It was unexpectedly found that moving the nylon to the outer surface of the film improves the abuse characteristics of the film given the same overall ratios of components. Not only are tear and puncture strength improved, but heat resistance of the outer surface during preparation of the package is increased over what is provided by HDPE. As nylon has a higher melting temperature than HDPE, there are fewer problems related to it sticking to the heat bars during production sealing operations.

In addition, given the same amount of HDPE in a film that has a nylon layer on the surface instead of as a buried layer, the moisture vapor transmission rate (MVTR) is surprisingly improved. This may be because HDPE has a surface effect that reduces the moisture barrier of the multilayer film when the HDPE is located on the outside of the film. In certain embodiments, the multilayer film exhibits a moisture vapor transmission rate of no more than about 0.30 g/100 in$^2$/day, or no more than about 0.20 g/100 in$^2$/day.

Moreover, placing nylon on the outside of the film structure will increase the machine direction tear strength by as much as 3 times. By using the nylon layer as the surface layer, the film can be downgauged from about 2.0-3.0 mils to between about 0.8 to about 1.7 mils, or typically, about 1.2 mils. Moreover, coextruding a layer of nylon with HDPE unexpectedly prevents the film from easily tearing in the machine direction after the machine direction orientation process. In certain embodiments, the multilayer film structure exhibits a machine direction tear strength of greater than 40 grams, or greater than 120 grams, or alternatively greater than 190 grams.

The polyamide layer may be any of various nylons commonly used in the art of making polymeric films, including nylon 6, nylon 6,6, nylon 6,66, nylon 12, nylon MX-D6, or amorphous nylon. In an embodiment, the nylon used in the film structure may be nylon 6. In another embodiment, the nylon used in the film structure may be nylon 6,66. However, in an alternate embodiment the nylon comprises an amorphous nylon copolymer that is blended with one or more various other nylons. An amorphous nylon copolymer is a particular type of nylon polymer that differs from crystalline or semicrystalline nylons. Amorphous nylon copolymers are characterized by a lack of crystallinity, which can be shown by the lack of an endotherm crystalline melting point in a Differential Scanning Calorimeter ("DSC") test ASTM D-3417.

Various layers of the multilayer film structure may be adhered together with tie, or adhesive layers. In an embodiment, a tie or adhesive layer may be a coextrusion of low density polyethylene (LDPE) and ethylene acrylic acid copolymer (EAA) or an anhydride modified polyethylene. In certain embodiments, the tie or adhesive layer comprises maleic anhydride modified polyethylene copolymer, such as ethylene vinyl acetate (EVA)-based or linear low density polyethylene (LLDPE)-based adhesive. The tie or adhesive layer may alternatively comprise any of the various other polymeric adhesives commonly used in the art of making multilayer films.

The buried layer of the multilayer film structure comprises high density polyethylene (HDPE). As used herein, the phrase high density polyethylene ("HDPE") refers to ethylene alpha-olefin copolymers or ethylene homopolymer having a density of about 0.94 g/cm$^3$ or greater. HDPE can be produced with several classes of catalysts, such as Ziegler-Natta catalysts and metallocene catalysts.

In embodiments of the invention, the buried layer comprises high moisture barrier high density polyethylene, such as the HDPE available from Nova Chemicals. Nova-SUR-PASS® HDPE includes high density polyethylene and a nucleating agent to achieve the moisture barrier and other physical properties. Because of the increased moisture barrier, a thinner layer of HDPE may be used to provide the same moisture vapor transmission rate, and thus the HDPE portion of the structure can be downgauged. The HDPE buried layer may have a thickness of about 0.48 mils, for example. In certain aspects of the invention, the HDPE buried layer may have a thickness as low as 0.3 mils.

Another suitable HDPE is Alathon® L5885, which has a melt index of about 0.85 g/10 min and a density of about 0.958 g/cm$^3$. Alathon® L5885 is available from Lyondell-Basell Industries, Houston, Tex. A further suitable HDPE is Elite® 5960G HDPE, which has a melt index of about 0.85 g/10 min and a density of about 0.962 g/cm$^3$. Elite® 5960G HDPE is available from The Dow Chemical Company, Midland, Mich.

Figure 2:
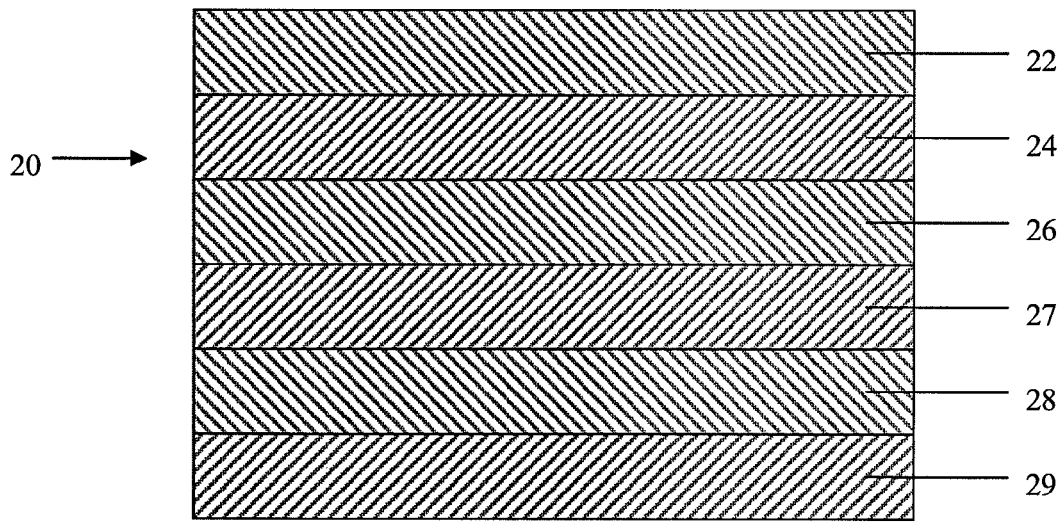
FIG. 2 illustrates a cross-section of a multilayer polymeric film comprising six layers.

The multilayer film structure may further comprise additional buried, or interior, layers, depending on the desired properties of the multilayer film. For example, one or more additional polyamide layers may be included in the interior of the multilayer film. Referring to FIG. 2, in an embodiment a six layer multilayer film 20 comprises a nylon layer 26 disposed between the buried HDPE layer 28 and the tie layers 24 and 27 that adhere the buried layer 26 to the nylon skin layer 22 and to the HDPE layer 28, providing the following structure: nylon (22)/tie (24)/nylon (26)/tie (27)/HDPE (28)/sealant (29). The addition of a second polyamide layer further increases the machine direction tear strength of the multilayer film structure. Polyamide may comprise up to about 30% of the total thickness of the multilayer film structure.

In an embodiment, an oxygen barrier material may be incorporated into the multilayer film structure. The oxygen barrier material may comprise any material known to provide a barrier to oxygen, including but not limited to ethylene vinyl alcohol (EVOH), polyvinylidene chloride (PVDC) copolymers (such as Saran®), nylon MX-D6, or barrier coatings. In certain embodiments, the oxygen barrier material may be a buried layer, while in other embodiments it may be employed as the outer skin layer of the multilayer film structure. For example, a film comprising an ethylene vinyl alcohol as an oxygen barrier layer may have the following structure: nylon/EVOH/nylon/tie/HDPE/sealant. Alternatively, a film comprising an ethylene vinyl alcohol as an oxygen barrier layer may have the following structure: EVOH/nylon/tie/nylon/tie/HDPE/sealant.

In another embodiment, nylon MX-D6 may be employed as an oxygen barrier material. Nylon MX-D6 is a general name for polyamides prepared by polycondensation of m-xylenediamine with adipic acid, and comprises an aliphatic polyamide having an aromatic ring in its main chain. Nylon MX-D6 has both excellent gas barrier properties against oxygen and the abuse properties typical of nylon, thus nylon MX-D6 is capable of taking the place of two separate nylon and oxygen barrier layers. For instance, a film comprising nylon MX-D6 may have the following structure: nylon MX-D6/tie/nylon/tie/HDPE/sealant.

In certain embodiments, an interior layer of another polyethylene is included, for instance, linear low density polyethylene. An example of such a multilayer film structure is as follows: nylon/tie/LLDPE/HDPE/sealant. Alternatively, the linear low density polyethylene (LLDPE) may instead be present in a single blended layer of HDPE and LLDPE, such as having the following structure: nylon/tie/LLDPE-HDPE/sealant. The inclusion of LLDPE in the structure provides an improvement in the tear strength of the film.

The multilayer film structure includes a sealant layer, which allows the film to be sealed to its own outer surface layer or to another multilayer film structure, such as to form an innerliner package. In an embodiment, the sealant layer is heat sealable. The term "heat sealable," as used herein, means sealable or bondable by heat however obtained, for example, by induction or magnetic, ultrasonic, radio frequency, light, or other energy sources which cause the materials to bond, fuse or otherwise seal. Such heat sealable materials usually are thermoplastic film forming polymers, are well-known in the art, and include an ionomer, such as Surlyn®, LLDPE, including all linear polyethylenes with density up to about 0.95 g/cc, LDPE, ethylene vinyl acetate, polybutylene, polypropylene-based plastomers, homopolymers or random copolymers, medium density polyethylene (MDPE), high density polyethylene (HDPE), ultra low density polyethylene, very low density polyethylene, olefins catalyzed by a single site catalyst such as metallocene, EMA, EAA, ethylene normal-butyl acrylate (ENBA), copolymers of ethylene and ethylenically unsaturated comonomer selected from the group consisting of carboxylic acids and esters, salts and anhydrides thereof, ethylene methacrylic acid copolymer, or a blend of any of these polymers. The sealant layer may also include additives for high speed processing, such as slip additive and antiblock compound. Further, the sealant layer may comprise materials to provide a peelable seal, for instance any suitable compound that is incompatible with the selected sealant materials. The presence of the incompatible material will decrease the strength of the sealed bond and thereby also decrease the amount of force required to break the seal.

Multilayer film structures of embodiments of the invention may be made via cast coextrusion, extrusion coating and/or extrusion lamination, adhesive lamination, blown-film coextrusion or water-quenched coextrusion or any other film-making method generally known to those having ordinary skill in the art. In certain embodiments, the layers of the film are cast coextruded together. In embodiments of the invention, the multilayer film is oriented during production. Orienting the film in the machine direction increases machine direction tear strength, gives the film better stiffness, and increases barrier properties. Because the standard cast process also imparts some machine direction orientation during film extrusion, the addition of a polyamide layer is also beneficial to improvement in machine direction tear when the film structures are prepared using cast coextrusion.

The multilayer film structure of the present invention provides numerous advantages over multilayer film structures previously used to form innerliner packages for dry food products. As discussed above, the use of Nova-SURPASS® HDPE provides twice as much moisture barrier as provided by other HDPE resins, which allows the HDPE portion of the structure to be downgauged. This provides a film structure with lower costs due to the use of less HDPE resin. By reducing the total multilayer film thickness to about 1.2 mils, for instance, material costs will be cut by about half. For example, a cereal manufacturing company may use up to 40 million pounds of innerliner film per year for packaging the cereal. With material costs in excess of $1.50-$1.60/lb, for instance, there is significant cost saving in material alone, as well as the sustainability impact in not having to ship, dispose, etc., as much material. In addition, the placement of a nylon layer as an outer layer reduces the number of tie layers in the structure by one because a tie layer is not needed between the buried HDPE layer and the sealant layer, thereby providing both cost and material savings.

Yet another advantage of downgauging a multilayer film structure for use as a package is that the thinner film structure has a more transparent appearance than a conventional film structure currently used for innerliner packages. In addition, the use of a nylon layer as the outer skin layer allows for easy printing on the exterior of the film, if desired.

Further, the Nova-SURPASS® HDPE product surprisingly has a crystallization temperature that is closer to that of nylon than other HDPE resins. This characteristic eliminates the curl phenomenon that can be a difficult issue when processing multilayer films on packaging machines when the films have layers with very different crystallization temperatures.

As noted above, in typical innerliner packages having HDPE on the outside, there is a powder residue component that comes off of the film during the processing when manufacturing the innerliner bags. This is both a maintenance issue and a health issue. In an innerliner package having nylon on the outside, there is no powder residue. This reduces both maintenance and Environmental Health and Safety (EHS) costs.

EXAMPLES

The following examples are illustrative of embodiments of the present invention, as described above, and are not meant to limit the invention in any way.

Example 1

A multilayer film structure was prepared having a nylon outer layer and a high moisture barrier HDPE buried layer. The film had a gauge of 1.2 mils and consisted of the following layers in order from the outer skin layer to the inner sealant layer: nylon 6,66/tie/LLDPE/Nova SURPASS® HDPE/peelable ionomer blend. The SURPASS® HDPE was the HPs167-AB homopolymer sHDPE film resin available from Nova Chemicals (Moon Township, Pa.). Nylon comprised 20% of the thickness of the total multilayer film.

Example 2

A multilayer film structure was prepared having a nylon outer layer, a high moisture barrier HDPE buried layer, and a nylon buried layer. The film had a gauge of 1.2 mils and consisted of the following layers in order from the outer skin layer to the inner sealant layer: nylon 6,66/tie/nylon 6,66/tie/Nova SURPASS® HDPE/peelable ionomer blend. Nylon comprised 20% of the thickness of the total multilayer film.

Example 3

A multilayer film structure was prepared having a nylon outer layer and a high moisture barrier HDPE buried layer. The film had a gauge of 1.2 mils and consisted of the following layers in order from the outer skin layer to the inner sealant layer: nylon 6,66/tie/LLDPE/Nova SURPASS® HDPE/peelable ionomer blend. Nylon comprised 25% of the thickness of the total multilayer film.

Example 4

A multilayer film structure was prepared having a nylon outer layer and a high moisture barrier HDPE buried layer. The film had a gauge of 1.2 mils and consisted of the following layers in order from the outer skin layer to the inner sealant layer: nylon 6,66/tie/LLDPE/Nova SURPASS® HDPE/peelable ionomer blend. LLDPE comprised 15% of the thickness of the multilayer film.

Example 5

A multilayer film structure was prepared having a nylon outer layer and a high moisture barrier HDPE buried layer. The film had a gauge of 1.2 mils and consisted of the following layers in order from the outer skin layer to the inner sealant layer: nylon 6,66/tie/LLDPE/Nova SURPASS® HDPE/peelable ionomer blend. The multilayer film was oriented in the machine direction with an orientation draw ratio of 3.5/1.

Example 6

A multilayer film structure was prepared having a nylon outer layer and two HDPE buried layers. The film had a gauge of 1.2 mils and consisted of the following layers in order from the outer skin layer to the inner sealant layer: nylon 6,66/tie/Alathon® L5885 HDPE/Alathon® L5885 HDPE/peelable ionomer blend.

Comparative Example 7

A multilayer film structure was prepared having an HDPE outer layer and a nylon buried layer. The film had a gauge of 1.2 mils and consisted of the following layers in order from the outer skin layer to the inner sealant layer: Alathon® L5885 HDPE/tie/nylon 6,66/tie/peelable ionomer blend.

Comparative Example 8

A multilayer film structure was prepared having a high moisture barrier HDPE outer layer and a nylon buried layer. The film had a gauge of 1.2 mils and consisted of the following layers in order from the outer skin layer to the inner sealant layer: Nova SURPASS® HDPE+LLDPE/tie/nylon 6,66/tie/peelable ionomer blend. Nylon comprised 20% of the thickness of the total multilayer film.

Comparative Example 9

A multilayer film structure was prepared having an HDPE outer layer and a nylon buried layer. The film had a gauge of 2.2 mils and consisted of the following layers in order from the outer skin layer to the inner sealant layer: HDPE/tie/nylon 6,66/tie/peelable ionomer blend.

Comparative Example 10

A multilayer film structure was prepared having an amorphous nylon outer layer and a high moisture barrier HDPE buried layer. The film had a gauge of 1.2 mils and consisted of the following layers in order from the outer skin layer to the inner sealant layer: amorphous nylon/tie/LLDPE/Nova SURPASS® HDPE/peelable ionomer blend.

Example 11

A plurality of multilayer film structures were tested to determine the values of the following physical properties: moisture vapor transmission rate, 1% secant modulus, haze, machine direction and counter-machine direction tear strength, machine direction and counter-machine direction stiffness, and puncture resistance. Multilayer film structures of the embodiments of the invention described in Examples 1-5 were tested, as well as comparative multilayer film structures. The results are shown below in Table 1 and illustrate the differences between the properties achieved by the various layer compositions and their positions within the film structures. The machine direction tear strength was determined using ASTM method TM 0041-B and the puncture resistance was determined using ASTM method TM 2004.

Table 1 shows the difference the placement of the nylon layer has on the machine direction (MD) tear and on the moisture vapor transmission rate (MVTR), by comparing the physical characteristics of Example 6 and Comparative Example 7, which each had a thickness of 1.2 mils. Example 6 had nylon as a skin layer and comprised the following structure: nylon 6,66/tie/Alathon® L5885 HDPE/Alathon® L5885 HDPE/peelable ionomer blend. The multilayer film of Example 6 exhibited a MD tear strength of 67 grams. In contrast, the multilayer film of Comparative Example 7 exhibited a MD tear strength of just 27 grams and comprised the following structure: Alathon® L5885 HDPE/tie/nylon 6,66/tie/peelable ionomer blend. Accordingly, switching the placement of the polyamide and HDPE layers such that the multilayer film comprised a nylon skin layer more than doubled the machine direction tear strength of the film.

The results of Table 1 also show the effect of using a high moisture barrier HDPE as the buried layer. As discussed above, Example 6 included HDPE as the buried layer and exhibited a MD tear strength of 67 grams. The MD tear strength of Example 1 was 99 grams and it comprised the following layers: nylon 6,66/tie/LLDPE/Nova SURPASS® HDPE/peelable ionomer blend. The high moisture barrier Nova SURPASS® HDPE improved the MD tear strength of the multilayer film by about a third over conventional HDPE. Furthermore, the moisture vapor transmission rate of the multilayer film comprising high moisture barrier HDPE was 0.16 g/100 in$^2$/day, which is less than half the MVTR of Example 6 of 0.39 g/100 in$^2$/day.

Comparative Example 9 is representative of standard innerliner packages used for packaging dry food products. Comparative Example 9 has a thickness of 2.2 mils, a MD tear strength of 147 grams and the following structure: HDPE/tie/nylon 6,66/tie/peelable ionomer blend. In contrast, Example 3 provides a MD tear strength of 143 grams with just a 1.2 mils thick film of the following structure: nylon 6,66/tie/LLDPE/Nova SURPASS® HDPE/peelable ionomer blend. Moreover, the addition of a second nylon layer improved the MD tear strength to 202 grams in the 1.2 mils thick film of Example 2 that had the following structure: nylon 6,66/tie/nylon 6,66/Nova SURPASS® HDPE/peelable ionomer blend.

TABLE 1

Structure and physical properties of multilayer film structures.

| Structure | MVTR | Gauge | OTR | 1% Secant Modulus | | Haze | Tear | | Stiffness | Puncture |
| | | | | MD | CD | | MD | CD | | |
| --- | --- | --- | --- | --- | --- | --- | --- | --- | --- | --- |
| Example 1: nylon/tie/LLDPE/ SURPASS ® HDPE/ionomer | 0.16 | 1.2 mils | 14 | 89,400 | 98,400 | 8 | 99 | 189 | 1.2 1.3 | 1.5 |
| Example 2: nylon/tie/nylon/tie/ SURPASS ® HDPE/ionomer | 0.29 | 1.2 mils | 11 | 62,800 | 73,100 | 10 | 202 | 316 | 0.8 0.8 | 1.85 |
| Example 3: nylon/tie/LLDPE/ SURPASS ® HDPE/ionomer | 0.20 | 1.2 mils | 10 | 73,700 | 77,000 | 10 | 143 | 286 | 1.0 0.9 | 1.33 |
| Example 4: nylon/tie/LLDPE/ SURPASS ® HDPE/ionomer | 0.18 | 1.2 mils | 11 | 68,000 | 73,000 | 10 | 122 | 242 | 0.9 1.1 | 1.64 |
| Example 5: nylon/SURPASS ® HDPE/ ionomer | 0.15 | 1.2 mils | — | — | — | — | 57 | 175 | — — | 2.18 |

TABLE 1-continued

Structure and physical properties of multilayer film structures.

| Structure | MVTR | Gauge | OTR | 1% Secant Modulus MD | 1% Secant Modulus CD | Haze | Tear MD | Tear CD | Stiffness | | Puncture |
|---|---|---|---|---|---|---|---|---|---|---|---|
| Example 6: nylon/tie/Alathon ® L5885 HDPE/Alathon ® L5885 HDPE/ionomer | 0.39 | 1.2 mils | 14 | 83,500 | 102,800 | 14 | 67 | 289 | 1.3 | 1.2 | 1.62 |
| Comparative Example 7: Alathon ® L5885 HDPE/tie/nylon/tie/ionomer | 0.29 | 1.2 mils | 16 | 87,200 | 108,800 | 24 | 27 | 168 | 1.4 | 1.9 | 1.22 |
| Comparative Example 8: SURPASS ® HDPE + LLDPE/tie/nylon/tie/ionomer | 0.18 | 1.2 mils | 16 | 88,100 | 107,600 | 11 | 27 | 108 | 1.3 | 1.6 | 1.17 |
| Comparative Example 9: HDPE/tie/nylon/tie/ionomer | 0.14 | 2.2 mils | — | — | — | — | 147 | 345 | 12.8 | 17.1 | 2.30 |
| Comparative Example 10: amorphous nylon/tie/LLDPE/SURPASS ® HDPE/ionomer | 0.15 | 1.2 mils | 10 | 151,700 | 150,700 | 11 | 20 | 19 | 2.4 | 2.4 | 1.77 |

Example 12

Figure 3:
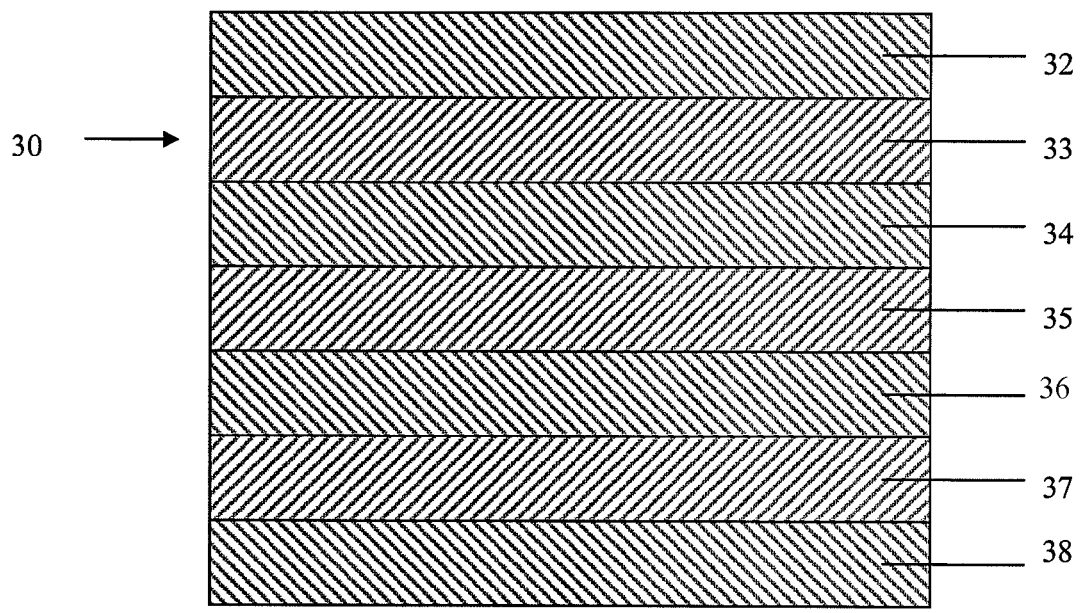
FIG. 3 illustrates a cross-section of a multilayer polymeric film comprising seven layers.

Referring to FIG. 3, a seven layer multilayer film structure 30 may be prepared having a nylon outer layer 32, a high moisture barrier HDPE buried layer 37, and a nylon buried layer 34. The film has a gauge of 1.2 mils and consists of the following layers in order from the outer skin layer to the inner sealant layer: 7.5% nylon 6,66 (32)/7.5% tie (33)/7.5% nylon 6,66 (34)/7.5% tie (35)/10% LLDPE (36)/40% Nova SURPASS® HDPE (37)/20% peelable ionomer blend (38). Amorphous nylon may be included in the buried nylon 6,66 layer, if needed, to improve the stiffness of the film.

Example 13

A multilayer film structure may be prepared having a nylon outer layer, a high molecular weight HDPE buried layer, a nylon buried layer and an EVOH buried layer. The film has a gauge of 1.2 mils and consists of the following layers in order from the outer skin layer to the inner sealant layer: 7.5% nylon 6,66/7.5% EVOH/7.5% nylon 6,66/7.5% tie/10% LLDPE/40% Nova SURPASS® HDPE/20% peelable ionomer blend. Amorphous nylon may be included in the buried nylon 6,66 layer, if needed.

Example 14

A multilayer film structure may be prepared having a nylon MX-D6 outer layer and a high moisture barrier HDPE buried layer. The film has a gauge of 1.2 mils and consists of the following layers in order from the outer skin layer to the inner sealant layer: nylon MX-D6/tie/Nova SURPASS® HDPE/peelable ionomer blend.

Example 15

A multilayer film structure may be prepared having a nylon outer layer and a high moisture barrier HDPE buried layer. The film has a gauge of 1.2 mils and consists of the following layers in order from the outer skin layer to the inner sealant layer: nylon 6/tie/Nova SURPASS® HDPE/ionomer.

While the invention has been described with respect to specific examples including presently preferred modes of carrying out the invention, those skilled in the art will appreciate that there are numerous variations and permutations of the above described structures that fall within the spirit and scope of the invention. It should be understood that the invention is not limited in its application to the details of construction and arrangements of the components set forth herein. Variations and modifications of the foregoing are within the scope of the present invention. It is also being understood that the invention disclosed and defined herein extends to all alternative combinations of two or more of the individual features mentioned or evident from the text. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

The invention claimed is:

1. A multilayer film comprising a nylon skin layer, a buried high moisture barrier high density polyethylene (HDPE) layer, and an outer surface sealant layer, the multilayer film having a thickness of less than 2.0 mils, the multilayer film exhibiting a moisture vapor transmission rate of 0.3 g/100 in$^2$/day or less and exhibiting a tear strength in the machine direction of at least 40 grams, wherein the nylon skin layer comprises a material selected from the group consisting of nylon 6, nylon 6,6, nylon 6,66, nylon 12, and nylon MX-D6, and wherein the sealant layer comprises a material selected from the group consisting of ionomer; LLDPE; LDPE; ethylene vinyl acetate; polybutylene; polypropylene-based plastomers, homopolymers or random copolymers; medium density polyethylene (MDPE); high density polyethylene (HDPE); ultra low density polyethylene; very low density polyethylene, olefins catalyzed by a single site catalyst; EMA; EAA; ethylene normal-butyl acrylate (ENBA); copolymers of ethylene and ethylenically unsaturated comonomer selected from the group consisting of carboxylic acids and esters, salts and anhydrides thereof; ethylene methacrylic acid copolymer; and a blend of any of these polymers.

2. The multilayer film of claim 1, wherein the film exhibits a tear strength in the machine direction of at least 120 grams.

3. The multilayer film of claim 1, further comprising at least one buried nylon layer disposed between the nylon skin layer and the buried high moisture barrier HDPE layer.

4. The multilayer film of claim 2, wherein the film exhibits a tear strength in the machine direction of greater than 190 grams.

5. The multilayer film of claim 1, wherein the film exhibits a moisture vapor transmission rate of 0.20 g/100 in$^2$/day or less.

6. The multilayer film of claim 1, wherein the thickness is about 0.8 to about 1.7 mils.

7. The multilayer film of claim 1, wherein the thickness is about 1.2 mils.

8. The multilayer film of claim 1, further comprising an oxygen barrier layer.

9. The multilayer film of claim 1, wherein the film is oriented by machine direction orientation.

10. The multilayer film of claim 1, further comprising a buried layer of linear low density polyethylene (LLDPE).

11. The multilayer film of claim 1, wherein the nylon layer and high moisture barrier HDPE layer are co-extruded.

12. The multilayer film of claim 1, wherein nylon comprises up to about 30% of the total thickness of the film.

13. A package comprising the multilayer film of claim 1.

14. The package of claim 13 further comprising at least one buried polyamide layer.

15. The package of claim 14, wherein the thickness of the multilayer film is about 0.8 to about 1.7 mils.

16. A multilayer film consisting essentially of a nylon skin layer, a tie layer, a buried linear low density polyethylene (LLDPE) layer, a buried high moisture barrier high density polyethylene (HDPE) layer, and an outer surface sealant layer comprising ionomer; LLDPE; LDPE; ethylene vinyl acetate; polybutylene; polypropylene-based plastomers, homopolymers or random copolymers; medium density polyethylene (MDPE); high density polyethylene (HDPE); ultra low density polyethylene; very low density polyethylene, olefins catalyzed by a single site catalyst; EMA: EAA; ethylene normal-butyl acrylate (ENBA); copolymers of ethylene and ethylenically unsaturated comonomer selected from the group consisting of carboxylic acids and esters, salts and anhydrides thereof; ethylene methacrylic acid copolymer; or a blend of any of these polymers, wherein the tie layer is disposed between the nylon skin layer and the LLDPE layer, wherein the LLDPE layer is disposed between the tie layer and the high moisture barrier HDPE layer, wherein the high moisture barrier HDPE layer is disposed between the LLDPE layer and the sealant layer, and wherein the sealant layer is disposed adjacent the high moisture barrier HDPE layer and allows the film to be sealed to its own outer surface layer or to another multilayer film structure, the multilayer film having a thickness of between 0.8 to 1.7 mils, the multilayer film exhibiting a moisture vapor transmission rate of 0.3 g/100 in$^2$/day or less and exhibiting a tear strength in the machine direction of at least 120 grams.

17. A multilayer film comprising:
a first nylon layer, wherein the first nylon layer comprises a material selected from the group consisting of nylon 6, nylon 6,6, nylon 6,66, nylon 12, and nylon MX-D6;
an outer surface sealant layer, wherein the sealant layer comprises a material selected from the group consisting of ionomer; LLDPE; LDPE; ethylene vinyl acetate; polybutylene; polypropylene-based plastomers, homopolymers or random copolymers; medium density polyethylene (MDPE); high density polyethylene (HDPE); ultra low density polyethylene; very low density polyethylene, olefins catalyzed by a single site catalyst; EMA; EAA; ethylene normal-butyl acrylate (ENBA); copolymers of ethylene and ethylenically unsaturated comonomer selected from the group consisting of carboxylic acids and esters, salts and anhydrides thereof; ethylene methacrylic acid copolymer; and a blend of any of these polymer;
a high moisture barrier high density polyethylene (HDPE) layer disposed between the first nylon layer and the sealant layer; and
a second nylon layer disposed between the first nylon layer and the high moisture barrier HDPE layer;
wherein the multilayer film has a thickness of less than 2.0 mils, wherein the multilayer film exhibits a moisture vapor transmission rate of 0.3 g/100 in$^2$/day or less and wherein the multilayer film exhibits a tear strength in the machine direction of at least 40 grams.

18. The multilayer film of claim 17, further comprising an oxygen barrier layer.

19. The multilayer film of claim 18, wherein the oxygen barrier layer comprises the outer skin layer of the multilayer film.

20. The multilayer film of claim 18, wherein the oxygen barrier layer comprises a buried layer of the multilayer film.

* * * * *